US012764292B2

(12) United States Patent
Adams et al.

(10) Patent No.: US 12,764,292 B2
(45) Date of Patent: Oct. 13, 2026

(54) BLANKET TRANSISTOR ARRAY FOR ELECTROPHORETIC COATINGS AND METHODS THEREOF

(71) Applicant: The Boeing Company, Arlington, VA (US)

(72) Inventors: Scott Alan Adams, Everett, WA (US); Edward Ryan Greene, Charleston, SC (US); Kjersta Lynn Larson-Smith, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 297 days.

(21) Appl. No.: 18/528,458

(22) Filed: Dec. 4, 2023

(65) Prior Publication Data

US 2024/0155115 A1 May 9, 2024

(51) Int. Cl.
*G02F 1/165* (2019.01)
*G02F 1/167* (2019.01)
(Continued)

(52) U.S. Cl.
CPC ........... *H04N 19/126* (2014.11); *G02F 1/165* (2019.01); *G02F 1/167* (2013.01);
(Continued)

(58) Field of Classification Search
CPC ............... G02F 1/1685; G02F 1/16757; G02F 1/16766; G02F 1/167; G02F 1/165
See application file for complete search history.

(56) References Cited

U.S. PATENT DOCUMENTS

2010/0156859 A1* 6/2010 Sakurai .................. G02F 1/167 345/55
2012/0001889 A1* 1/2012 Kimura ................ H10D 86/421 345/212

(Continued)

FOREIGN PATENT DOCUMENTS

JP 2016014784 A 1/2016
KR 20180057989 A 5/2018

OTHER PUBLICATIONS

Extended European Search Report issued Apr. 24, 2025 in corresponding European Application No. 24216116.4, 9 pages.

*Primary Examiner* — Angela M. Medich
(74) *Attorney, Agent, or Firm* — MH2 Technology Law Group LLP

(57) ABSTRACT

An apparatus for electrophoretic control of surfaces is described, including a vehicle component having an outer surface, a substrate, and a coating layer positioned on the substrate, where the coating layer includes electrostatically controlled ink microcapsules, a first pigment having a first color and a negative charge, a second pigment having a second color and a positive charge. The apparatus includes a layer array with a plurality of thin film transistors (TFTs) disposed laterally across the layer array. The apparatus includes a layer array that is positionable to be in proximity to the coating layer. A method for electrophoretic control of surfaces is also described, including placing a layer array in proximity to an outer surface of a component or panel, imparting a first electrical charge from the layer array to change a visual appearance of the outer surface from a first visual appearance to a second visual appearance.

20 Claims, 3 Drawing Sheets

(51) Int. Cl.

| | |
|---|---|
| ***G02F 1/1685*** | (2019.01) |
| ***H04N 19/126*** | (2014.01) |
| *G02F 1/16757* | (2019.01) |
| *G02F 1/16766* | (2019.01) |

(52) U.S. Cl.
CPC ...... *G02F 1/16757* (2019.01); *G02F 1/16766* (2019.01); *G02F 1/1685* (2019.01)

(56) References Cited

U.S. PATENT DOCUMENTS

| | | | |
|---|---|---|---|
| 2016/0062205 | A1 | 3/2016 | Bernhardt |
| 2023/0004061 | A1 | 1/2023 | Telfer et al. |

* cited by examiner

BLANKET TRANSISTOR ARRAY FOR ELECTROPHORETIC COATINGS AND METHODS THEREOF

TECHNICAL FIELD

The present teachings relate generally to electrophoretic materials and, more particularly, to systems and methods of changing the state of electrophoretic materials.

BACKGROUND

There are several areas related to the aviation and aerospace industries to develop technology that allows for the alteration of the appearance of specific parts of an aircraft, such as the wing, hull, or body. Some of the key motivations for such technology include stealth, camouflage, or visual signature, aesthetic customization, logo, branding, and other graphics. In certain areas of aviation or transport, changing the visual signature of an aircraft or adding camouflage, can allow a vehicle to blend into its surroundings or become less detectable to radar and other sensors, enhancing survivability and limiting detection in hostile environments.

In other examples, an ability to enhance or customize the aesthetics of a vehicle, visible changes to parts or components, such as the hull, body or wing, could customize the appearance of the vehicle for branding, color, or other specific visible alterations. Other examples of appearance altering categories for vehicles can include paint or color schemes, logo and branding usage, or the addition of temporary decals, graphics, or other visible elements.

Therefore, it is desirable for the development or use of technology that enables the alteration of the appearance of a vehicle in order to make aircraft or other vehicles more adaptable to various operating conditions or visual requirements.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An apparatus for electrophoretic control of surfaces is disclosed. The apparatus for electrophoretic control of surfaces includes a vehicle component or panel having an outer surface, and may include a substrate, and a coating layer positioned on the substrate, the coating layer may include a plurality of electrostatically controlled ink microcapsules, which may include a first pigment having a first color and a negative charge, a second pigment having a second color and a positive charge. The apparatus also includes a layer array may include a plurality of thin film transistors (TFTs) disposed laterally across the layer array. The apparatus also includes where the layer array is positionable to be in proximity to the coating layer. Implementations of the apparatus for electrophoretic control of surfaces can include where the thin film transistors impart an electrical charge to the plurality of electrostatically controlled ink microcapsules when in proximity to the outer surface. The layer array can be removable from the apparatus for electrophoretic control of surfaces. The layer array may include a flexible blanket. In examples, the layer array can include a rigid panel conforming to the outer surface of the vehicle component or panel. The layer array may include a movable wand conforming to the outer surface of the vehicle component or panel. The layer array can be fixed and integrated into the apparatus for electrophoretic control of surfaces. The layer array can be connected to an external programming device. The apparatus for electrophoretic control of surfaces may include a polymer layer, polymer coating, paint, or film adhered to the outer surface. The substrate may include a metal, resin, polymer composite, metal plating, or a combination thereof. In examples, a magnitude of the negative charge of the third pigment is different than a magnitude of the negative charge of the first pigment, and a magnitude of the positive charge of the fourth pigment is different than a magnitude of the positive charge of the second pigment. The outer surface of the vehicle component can be on an interior of a vehicle or on an exterior of a vehicle.

One general aspect of the present disclosure includes an apparatus for electrophoretic control of surfaces, which can include a vehicle component or panel having an outer surface, which may include a substrate, a coating layer positioned on the substrate, the coating layer may include a plurality of electrostatically controlled ink microcapsules, and may include a first pigment having a first color and a negative charge, a second pigment having a second color and a positive charge, and an integrated layer array positioned between the substrate and the coating layer, the integrated layer array may include a plurality of thin film transistors (TFTs) disposed laterally across the integrated layer array. Implementations of the apparatus for electrophoretic control of surfaces can include a receiver in communication with the integrated layer array. The apparatus for electrophoretic control of surfaces may include an external programming device connected to the receiver. Implementations of the described techniques or apparatus may include hardware, a method or process, or computer software on a computer-accessible medium to operate the apparatus for electrophoretic control of surfaces.

A method for electrophoretic control of surfaces is disclosed, including placing a layer array in proximity to an outer surface of a component or panel, where the layer array may include a plurality of thin film transistors (TFTs) disposed laterally across the layer array and where the layer array is connected to a programming device. The method also includes imparting a first electrical charge from the layer array to the component or panel where the component or panel may include an outer surface may include a coating layer having a plurality of electrostatically controlled ink microcapsules and thereby changing a visual appearance of the outer surface of the component or panel from a first visual appearance to a second visual appearance. Implementations of the method for electrophoretic control of surfaces can include removing the layer array from the outer surface of the component or panel after changing the visual appearance of the component or panel from the first visual appearance to the second visual appearance. The method for electrophoretic control of surfaces may include reapplying the layer array onto the component or panel, imparting a second electrical charge from the layer array to the plurality of electrostatically controlled ink microcapsules when in proximity to the outer surface of the component or panel, and changing a visual appearance of the outer surface of the component or panel from the second visual appearance to the first visual appearance. The plurality of electrostatically controlled ink microcapsules may include: a first pigment having a first color and a negative charge, and a second pigment having a second color and a positive charge.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
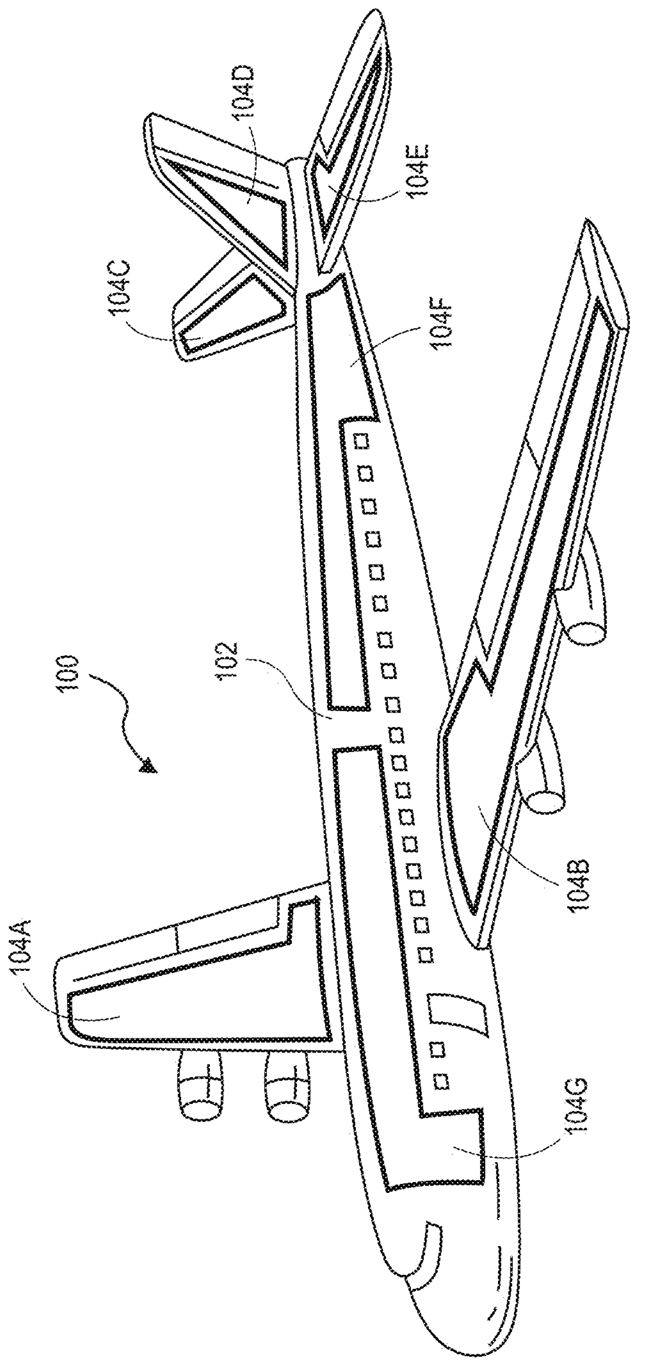
FIG. 1 is a schematic of an aerospace vehicle, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure relates to an article and a vehicle surface and structure thereof, such as a display film or surface, that utilizes functional additives contained within electrophoretically controllable capsules to control or modify a visual appearance or state of the structure. The functional additive is designed to display one or more colors as well as incorporate a positive or negative charge, making the article or surface effective at performing as a display or capable of providing a different, variable visual appearance in a switchable fashion. The article or display surface can be used in various industries, including aerospace, automotive, or consumer electronics.

Existing solutions for integrated displays in vehicle surfaces include an application of coatings or tints to surfaces or transparencies, as well as application of printed images on a variety of thin media. However, these solutions cannot be turned on or off or easily modified once applied and prevent changing the image or color displayed in an automated or efficient fashion. Examples of the present disclosure also provide the ability to electrically switch pigments in a filter, display, surface, or coating, which can intentionally change visual appearance, including color, variable data, branding, logo, or other visual information. This allows for specific images or colors to be displayed on-demand, such as providing information to a flight crew or passenger, to changing branding information, or providing a switchable camouflage or other appearance for specific vehicle uses that can be activated depending on the condition.

The technical features of the present disclosure further include the incorporation of organic and/or inorganic pigments into the electrophoretic particle capable of displaying specific colors. The functional additive and the capsule switches between a first state and a second state using electrophoretic switching, applied externally to each of a plurality of particles, also referred to as capsules or microcapsules, and it can absorb light in the visible range, near-infrared, or ultraviolet. In other examples, the absorbed light or electromagnetic radiation can be outside the visible range. The surface charge-controlled layer connects to a controller or programming device through an electrical connection. The gap between the first and second layers of the window or film can affect the functionality of the article and display by controlling the color displayed thereupon or holding the capsules within a carrier layer between the first and second layers. The article, surface, vehicle panel, coating layer, or film can be designed to meet specific requirements for different applications, such as reflecting light, blocking or absorbing light, or displaying different vehicle colors or patterns, including branding, logo, or other visual display information.

The examples described herein are versatile and can be used in combination with other display technologies, such as appliques, conventional displays, as well as windows when the electrophoretic display surface includes a transparent or partially transparent image in either an active or inactive state. The electrophoretically controlled articles or surfaces can be designed or packaged to perform in terms of thermal stability and durability. The article and surface can be made of known materials or a combination of materials known in conventional surface fabrication and can be designed to be bendable or flexible, depending on the specific requirements of the application or installation. The maximum gap between a first and second layer of the electrophoretically controlled film can be from about 80 to about 150 microns, depending on the application, and the plurality of capsules or the surrounding carrier layer can be filled with a liquid or gel-like substance that permits free rotation or motion of the electrophoretic capsules.

The present disclosure provides additional advantages to the field of aviation, astronautics, and the like, by providing an article and a surface that can be used in these various industries and can display different visual appearances or states on-demand. The technical features described herein provide advantages over existing solutions, such as the ability to electrically switch pigments in a filter, surface, film, or coating and enhancing the versatility of the article, surface, and thereby the performance of the vehicle or structure in which the article is incorporated. The examples of the present disclosure can be used in a variety of applications, including aerospace, automotive, and consumer electronics, and can provide versatile visual appearance surfaces on a surface or area of a vehicle.

The present disclosure includes the use of electrophoretic capsules, which incorporates technology that enables the manipulation and control of pigment particles within capsules to create versatile displays or block particular wavelengths, as in the object of the articles described herein. Electrophoretic capsules can be characterized and defined by the structure, composition, incorporated pigments, respective absorption ranges of the pigments, colors of the pigments, and bi-stabile nature of the electrophoretic capsules.

The electrophoretic capsules consist of a microencapsulated core that encapsulates electrically charged pigment particles or functional additives suspended in a clear, dielectric fluid. A flexible, transparent electrode surrounds the capsules, enabling the application of an electric field to control the position of the pigments within each capsule. The capsules can be arranged in an array to form a display, or in examples of the present disclosure, a targeted wavelength blocking or absorbing article. In examples, the structure of the electrophoretic capsules is similar to that of E Ink® displays, wherein microcapsules filled with charged pigments are sandwiched between two electrodes.

Eink® is a commercially available electrophoretic display technology that can include millions of microcapsules, containing charged pigments that can be manipulated by an electric field to create a printed-like appearance, similar to those as described herein. A display using these capsules can hold its appearance with no power required until the display needs to be changed, making it a more sustainable and fieldable option to LED or LCD displays. Displays can be available in black and white or multicolor options, can be made to be flexible, and have outdoor and indoor use cases across multiple environments or temperature use ranges. In examples, while readable images may not be the intent of the present disclosure, a portion or an entirety of the display, panel, or window can be configured to respond to an incoming programming instruction to change a portion or entirety of the display or panel to display an image or other visual pattern as directed by a vehicle occupant or a detection system or sensor.

Additionally, functional additives, pigments, or dyes can be incorporated into the electrophoretic capsules to enhance the stability and performance of the system. These functional additives can include stabilizers, surfactants, and polymers to optimize the dispersion and movement of pigment particles. For example, the addition of a polymer having with high dielectric constant can improve the response time of the electrophoretic capsules. Examples include polydimethylsiloxane, or co-polymers including polyvinylidene fluoride.

The selection of pigments in electrophoretic capsules, and in particular for those used in articles and examples of the present disclosure, plays a crucial role in determining the visual characteristics of the display. Electrophoretic capsules may utilize a wide range of pigment materials, including organic and inorganic particles. Titanium dioxide is a common pigment used in electrophoretic capsules for its high reflectivity and light-scattering properties. Other examples of electrophoretic capsules can incorporate quantum dots, nanoscale semiconductor particles, to expand the color gamut and improve display quality. Examples include cadmium selenide quantum dots to enhance the color saturation and range of electrophoretic displays or provide additional transmissive, reflective, or absorbing properties. In still other examples, electrophoretic capsules can be designed to include multiple pigments, or have pigments in discrete, multiple layers, each with distinct absorption ranges, to provide a broader spectrum of colors and improve display quality. When combining capsules with pigments that absorb in the red, green, and blue regions of the spectrum, this can allow for the production of full-color displays. For example, an appropriate combination of pigments and the ability to control their respective positions within the capsules can enable a wide range of colors to be displayed. From monochrome to full-color displays, electrophoretic capsules can achieve vibrant and customizable visual effects. These colors can include black and white, grayscale, and vibrant, saturated colors.

An additional property exhibited by electrophoretic capsules is bi-stability, meaning that once a pigment is positioned within a capsule, it remains stable without the need for a continuous power supply. This property allows for low power consumption and a persistent display without color shifting until such time that the pigment is re-positioned. As such, a static image can be displayed for an extended period, up to several weeks, with minimal power consumption. Furthermore, structures including electrophoretic capsules require power only when changing the display content, which can ensure prolonged battery life for articles or devices incorporating these capsules. Other properties of these types of electrophoretic capsules include temperature stability upon exposure to −55° C. and 85° C. after at least 3 hour exposure periods, high-visibility under wide angle viewing under dark and light viewing conditions without backlight, thermal Management, solar absorptance and emittance, and drivability by remote, wireless power.

The use of electrophoretic capsules loaded with pigments targeted to display specific electromagnetic bandwidths, including various colors, can find application in aerospace vehicle components. This can provide the ability to electrically switch pigments in a filter, display panel, film, coating, or other structure which can intentionally display colors in response to an internal or external charge. In examples including a multi-layer configuration, it can be possible for an article of the present disclosure to display one or more colors, have multiple colors displayable in a single display, or include combinations thereof.

In other examples, exemplary articles of the present disclosure can receive a signal from a removable sheet or blanket, including a plurality of thin-film transistors arranged in an array. An article can, for example, receive charging or display information from the sheet or blanket to switch on a particular visual appearance or image. Alternatively, the article can receive charging or display information from an integrated controller or from a wireless controller that does not include a physical connection. Such an article can be used for a switchable display could be activated depending on the situation or condition of an aircraft, such as during a maintenance interval, before landing, in-theater, refueling, and the like. While it is currently possible to coat transparencies or surfaces with pigments or paints, they cannot selectively display different, specific colors and they cannot be turned off or modified once applied. Traditional displays can be costly to modify or update. The use of modifications of electrophoretic tinting technology and the articles and methods provided herein include the ability to intentionally change display information without repainting or resurfacing portions of an aerospace or other vehicle.

FIG. 1 is a schematic of an aerospace vehicle, in accordance with the present disclosure. A vehicle 100, in this instance, an airplane, is shown, having a vehicle body 102 or a hull. In several locations about the vehicle body 102 are located various panels including two wing panels 104A, 104B, a first horizontal stabilizer panel 104C, a fin panel 104D, a second horizontal stabilizer panel 104E, a rear fuselage panel 104F, and a front fuselage panel 104G towards a front of the vehicle 100. Any of the aforementioned panels 104A, 104B, 104C, 104D, 104E, 104F, 104G can be suitable locations for placement or incorporation of articles or devices of the present disclosure within a vehicle 100, there may be other advantageous locations for placement of such articles, including, but not limited to internal surfaces, panels or on windows or other surfaces of a vehicle 100. In addition to aircraft, other vehicles or structures can incorporate panels or similar display articles such as described herein. These structures can include, but are not limited to automotive vehicles, marine vehicles, aerospace vehicles, and the like. The blanket arrays and display or films described herein can be used on any interior or exterior surface containing any type of electrophoretic capsules. It can be beneficial to use an appropriately sized version of the blanket array as a dedicated programming tool for use in interior signs, as it will be difficult to "hack" or penetrate security measures which can be important for use in safety related signs, such as, but not limited to exits and warnings. In examples, the background color of exemplary panels can be tailored, or color tuned as needed, and can be applied as a film, to be applied in some examples within an internal structure of a window or applied after construction using a pressure sensitive adhesive (PSA).

Figure 2B:
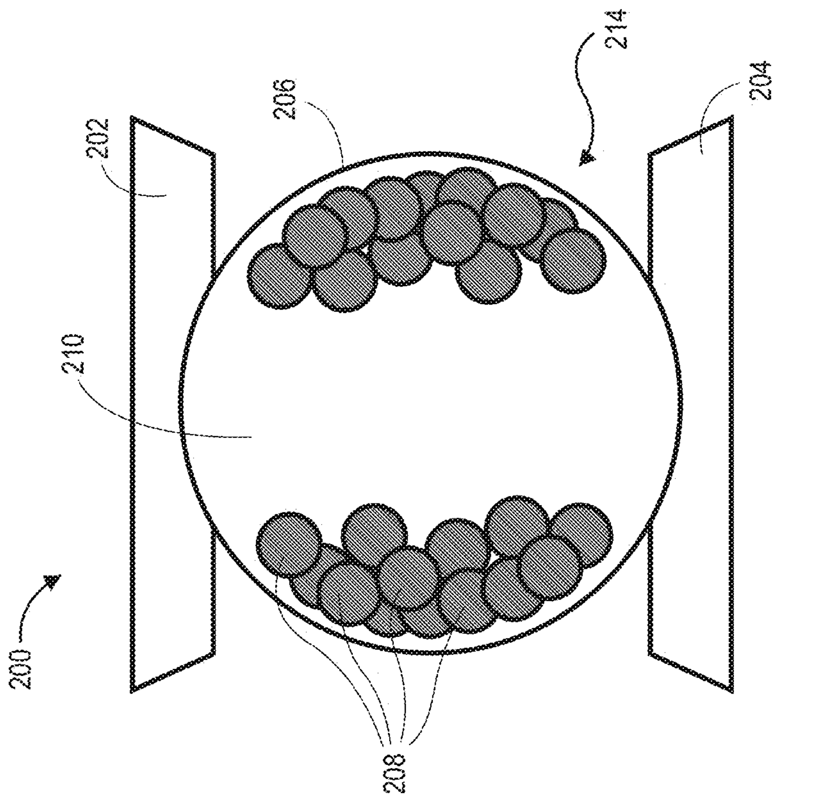
FIGS. 2A and 2B are schematic of an electrophoretic capsule, in a first state and a second state, respectively, in accordance with the present disclosure.
Figure 2A:
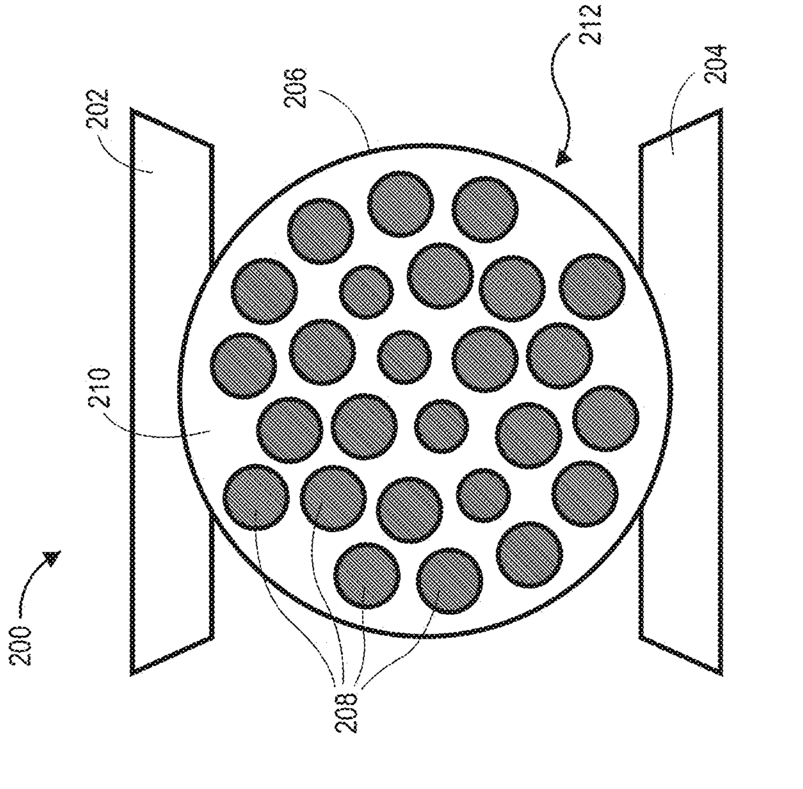

FIGS. 2A and 2B are schematic of an electrophoretic capsule, in a first state and a second state, respectively, in accordance with the present disclosure. FIG. 2A shows an electrophoretic capsule assembly 200 showing a capsule in a first activated state 212. The electrophoretic capsule 212 is an electrostatically controlled ink microcapsule that is sandwiched between a first electrode layer 202 and a second electrode layer 204. The first electrode layer 202 and second electrode layer 204 are configured to introduce a charge or bias to a plurality of pigment or functional additive particles 208 contained within a capsule outer shell 206 of the capsule to place the capsule in the first activated state 212. When activated, the plurality of pigment or functional additive particles 208 are free to move within a carrier layer 210 also contained within the capsule outer shell 206 of the capsule 212 and distribute within the carrier layer 210 such that the plurality of pigment or functional additive particles 208 fill the capsule 212 in such a manner that a color associated with the pigment or functional additive is displayed by the capsule 212. In other words, when the system is activated, the capsules containing color displaying particles cover the screen to show a portion of an image or visual appearance. In certain examples, the type of the plurality of pigment or functional additive particles 208 can be selected or designed such that viewing a film incorporating a plurality of capsules in a first activated state 212 displays an intended color. Examples of absorbing pigments or additives can be or include titanium dioxide, carbon black, and other colored pigments known to those skilled in the art in painting, printing, and the like.

FIG. 2B shows an electrophoretic capsule assembly 200 showing a capsule in a second inactive state 214. The electrophoretic capsule 214 is sandwiched between a first electrode layer 202 and a second electrode layer 204. The first electrode layer 202 and second electrode layer 204 are configured to introduce a charge or bias to a plurality of pigment or functional additive particles 208 contained within a capsule outer shell 206 of the capsule to place the capsule in the second inactive state 214. When inactivated, the plurality of pigment or functional additive particles 208 are free to move within a carrier layer 210 also contained within the capsule outer shell 206 of the capsule 214 and distribute within the carrier layer 210 such that the plurality of pigment or functional additive particles 208 are directed towards the capsule outer shell 206 in such a manner that visible light can be permitted to pass or transmit through the capsule 214 or pass through a film incorporating a plurality of capsules in a second inactive state 214. As such, when the system is disabled, the capsules 214 move to the sides, to create a transparent opening through the electrophoretic capsule assembly 200 that will show either nothing, or a background color or substrate that the article or device containing the electrophoretic capsule assembly 200 is mounted upon. In other examples of electrophoretic capsule assemblies, the electrode layers 202, 204 can be embedded within a windowpane or layer of a structured window as described herein, or be a freestanding, flexible film, rigid panel, or combination thereof.

In examples, these microcapsules can be approximately about the diameter of a human hair) contain a black pigment. Within each microcapsule, the pigment can move from side to side when power is applied. When pigments or functional additives move to the sides of the capsule, a transparent opening can be made which can be seen through or transmit light. When pigments or functional additives scatter, they fill in the capsule to create a closed, blocking, absorbing, or dark state. The functional additive comprises a pigment, more than one pigment, a pigment that displays a color, a pigment that displays one or more colors, or the use or incorporation of organic and/or inorganic pigments into the electrophoretic particle capable of displaying one or more colors, thus rendering the microcapsules transparent in one state (inactive) as compared to non transparent in another state (active). The size of the pigments, functional additives, or quantum dots can be from about 1 nm to about 20 microns. In examples, multiple films can alternatively be used to display multiple colors or effects.

In examples of the present disclosure, an apparatus for electrophoretic control of surfaces, can include a vehicle component or panel having an outer surface that further includes a substrate, and a carrier layer positioned on the substrate, the carrier layer comprising a plurality of electrostatically controlled ink microcapsules, which can include a first pigment having a first color and a negative charge, a second pigment having a second color and a positive charge, and a layer array comprising a plurality of thin film transistors (TFTs) disposed laterally across the layer array, and wherein the layer array is positionable to be in proximity to the carrier layer. In examples, the thin film transistors (TFTs) impart an electrical charge to the plurality of electrostatically controlled ink microcapsules when in proximity to the outer surface. In certain examples, the layer array is removable from the apparatus for electrophoretic control of surfaces. Alternatively, the layer array can be fixed and integrated into the apparatus for electrophoretic control of surfaces, or in some examples, connected to an external programming device. The layer array can be or include a flexible blanket or a rigid panel conforming to the outer surface of the vehicle component or panel, or a movable wand conforming to or capable or being positioned in proximity to the outer surface of the vehicle component or panel. In examples, a layer including polymer films, polymer layers, polymer coating layers, paint layers, or other films can be adhered to the outer surface of a vehicle component or panel as at least a portion of the surface of the vehicle surface. A substrate of a vehicle panel or surface can be or include a metal, resin, polymer composite, metal plating, or a combination thereof. Other examples include aluminum, titanium, carbon fiber composites, fiberglass, and composite substrates with layers that can include fiberglass, metals, such as copper foil or aluminum mesh, and carbon fiber. Other substrates can include glass, polycarbonate, acrylic, or other transparency materials. In certain examples, the apparatus for electrophoretic control of surfaces can further include a third pigment having a third color and a negative charge, and a fourth pigment having a fourth color and a positive charge, wherein a magnitude of the negative charge of the third pigment is different than a magnitude of the negative charge of the first pigment, and in other examples, a magnitude of the positive charge of the fourth pigment is different than a magnitude of the positive charge of the second pigment.

Figure 3:
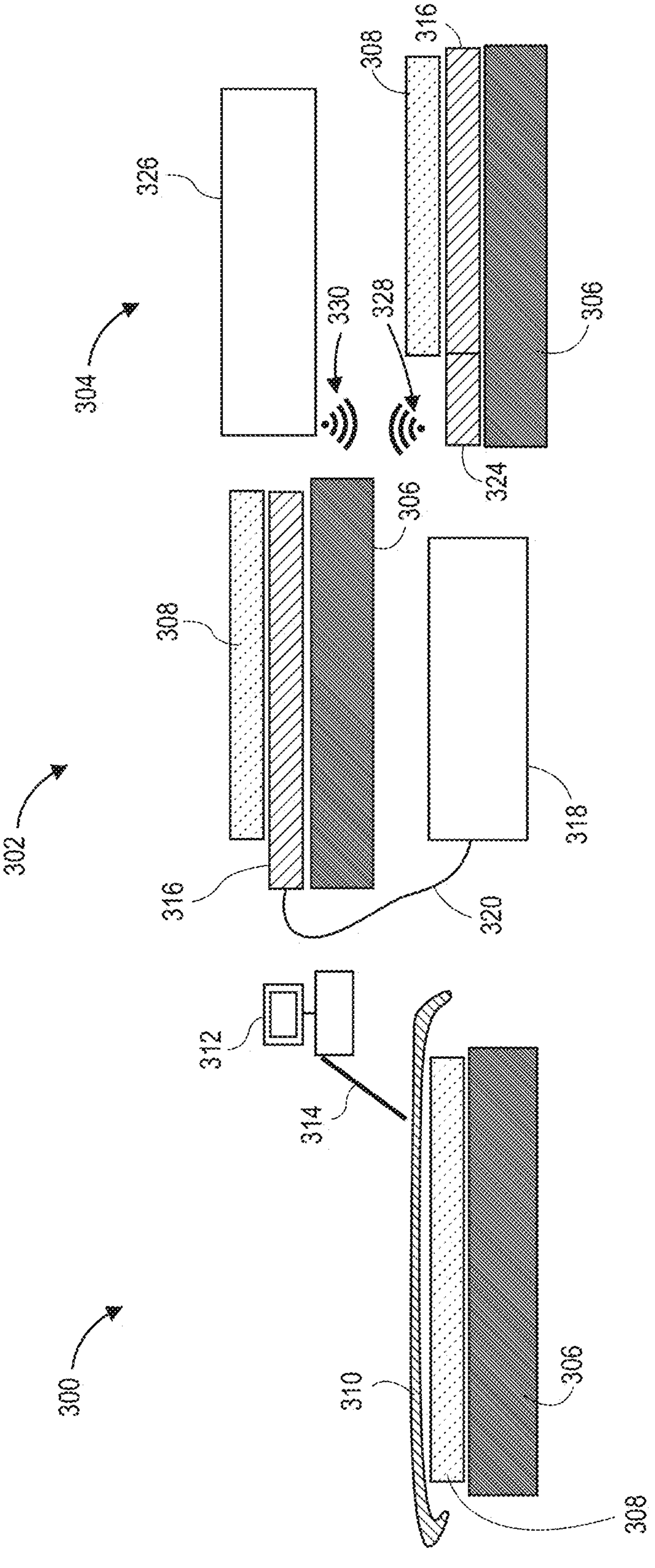
FIG. 3 is an exemplary schematic illustrating an apparatus for electrophoretic control of surfaces, in accordance with the present disclosure.

FIG. 3 is an exemplary schematic illustrating an apparatus for electrophoretic control of surfaces, in accordance with the present disclosure. A first apparatus for electrophoretic control of surfaces 300 is shown in a cross-sectional view, which includes a vehicle substrate 306 and a surface layer that includes an electrophoretic enabled coating 308. A vehicle component or panel having an outer surface includes the substrate 306. The electrophoretic enabled coating 308 can be a coating including a plurality of electrophoretic capsules, or a film or other layer including a plurality of electrophoretic capsules and other components as described herein. For example, the electrophoretic enabled coating 308 can also include a carrier layer positioned on the substrate, where the carrier layer includes a plurality of electrostatically controlled ink microcapsules which can further incorporate a first pigment having a first color and a negative charge, a second pigment having a second color and a positive charge, as well as additional pigments or additives having different charging capabilities as the other pigments or additives included in some of the plurality of electrostatically controlled ink microcapsules contained within the electrophoretic enabled coating 308. The TFTs and resulting arrays can be manufactured to different sizes. The density can be about 300 pixels/in, which has about an 80 micron pixel pitch. Capsules are nominally 30 microns in diameter. Pigments inside the capsule is typically less than 1 micron in size, and layers as described herein can include from about 1 to about 5 capsules per pixel depending on the TFT used. The first apparatus for electrophoretic control of surfaces 300 also includes a temporary flexible blanket-like programming array 310 including a plurality of thin-film transistors (TFTs). When in proximity to the electrophoretic enabled coating 308, the TFTs contained within the blanket-like programming array 310 can impart a charge to one or more pigments within one or more of the plurality of electrostatically controlled ink microcapsules within the electrophoretic enabled coating 308 to either activate or inactivate the electrophoretically controlled capsules. When the temporary blanket-like programming array 310 is in proximity to the electrophoretic enabled coating 308, one or more charges is imparted to one or more of the electrophoretically controlled capsules, thereby changing an image displayed by the electrophoretic enabled coating 308. After the blanket-like programming array 310 is removed from being proximal to the electrophoretic enabled coating 308, the image or visual appearance remains on the electrophoretic enabled coating 308 until subsequently changed at a later time by repeating the aforementioned process. The image or digital information containing the image and the necessary information to provide to the TFTs within the blanket-like programming array 310 can be transmitted to the blanket-like programming array 310 from a device 312, such as a computer or other computing device for transmitting the programming via a connection 314 between the device 312 and the temporary blanket programming array 310. In alternate examples, a TFT array or programming array can be a rigid panel conforming to the outer surface of the vehicle component or panel, a movable wand, or other handheld device conforming to or capable of being positioned in proximity to the outer surface of the vehicle component or panel.

A second apparatus for electrophoretic control of surfaces 302 having an integrated programming array 316 mounted on the vehicle substrate 306 is also shown, this example not requiring a removable programming array for updating or changing an image displayed by the second apparatus for electrophoretic control of surfaces 302. The principle of operation of the second apparatus for electrophoretic control of surfaces 302 is similar to that of the first apparatus for electrophoretic control of surfaces 300 in other regards. The second apparatus for electrophoretic control of surfaces 302 further includes an integrated onboard controller 318 in communication with the integrated programming array 316 by a physical connection 320 between the integrated onboard controller 318 and the integrated programming array 316. The integrated onboard controller 318 provides a digital image information to the integrated programming array 316 to provide programming or charging information to the coating 308 when desired.

A third apparatus for electrophoretic control of surfaces 304 having an integrated programming array 322 mounted on the vehicle substrate 306 is also shown, this example not requiring a removable programming array for updating or changing an image displayed by the second apparatus for electrophoretic control of surfaces 302. Again, the principle of operation of the third apparatus for electrophoretic control of surfaces 304 is similar to that of the first apparatus for electrophoretic control of surfaces 300 in other regards; integrated low power wireless transmitter/receiver 324; external programmer/controller 326; wireless signal transmission 328; wireless signal transmission 330.

The third apparatus for electrophoretic control of surfaces 304 further includes an integrated onboard controller 322 in communication with the integrated programming array 322 by a wireless connection between an external programmer/controller 326 and the integrated programming array 322. The external programmer/controller 326 provides a digital image information to the integrated programming array 322 to provide programming or charging information to the coating 308 when desired. This can be achieved wirelessly by a wireless signal transmission 328 received by the low power wireless transmitter/receiver 324 when a wireless signal transmission 330 is sent by the external programmer/controller 326. Thus the low power wireless transmitter/receiver 324 is in communication with the integrated programming array 322 layer within the third apparatus for electrophoretic control of surfaces 304.

In each example, the integrated layer array positioned between the substrate and the carrier layer includes a plurality of thin film transistors (TFTs) disposed laterally across the layer array. With the use of one of the first apparatus for electrophoretic control of surfaces 300, the second apparatus for electrophoretic control of surfaces 302, or the third apparatus for electrophoretic control of surfaces 304, a method for electrophoretic control of surfaces is provided. This method for electrophoretic control of surfaces provides a layer array onto a vehicle component or panel having an outer surface and a carrier layer, the layer array comprising a plurality of thin film transistors (TFTs) disposed laterally across the layer array and the carrier layer comprising a plurality of electrostatically controlled ink microcapsules, providing an external programming device from the outer surface of the vehicle component or panel, imparting a first electrical charge from the layer array to the plurality of electrostatically controlled ink microcapsules when in proximity to the outer surface of the vehicle component or panel, changing a visual appearance of the outer surface of the vehicle component or panel from a first visual appearance to a second visual appearance, and then, where a removable array or programming device is used, removing the external programming device from the outer surface of the vehicle component or panel. In examples, the method for electrophoretic control of surfaces includes removing the layer array from the outer surface of the vehicle component or panel after changing the visual appearance of the vehicle component or panel from the first visual appearance to the second visual appearance, or alternatively can include reapplying the layer array onto a vehicle component or panel, imparting a second electrical charge from the layer array to the plurality of electrostatically controlled ink microcapsules when in proximity to the outer surface of the vehicle component or panel, and changing a visual appearance of the outer surface of the vehicle component or panel from the second visual appearance to the first visual appearance.

In examples, a carrier layer can be disposed between the first layer and the second layer or within the display films of the present disclosure can include carrier layers that contains the plurality of capsules and permits free movement of each of the plurality of capsules within carrier layer materials such as, but not limited to physically transparent materials that are operative over a wide range of temperatures, such as silicones, water with or without additives to resist freezing or boiling, and the like. Examples utilizing silicone can result in slower, on the order of 1 ms, switching. This switching speed can also be dependent upon temperature, viscosity, or other factors. In examples, functional additives can include a negatively charged component and/or a positively charged component contained within each of the plurality of capsules, where the functional additive is switchable to a first state and a second state.

Examples of the present disclosure provide an apparatus and method to change the state of electrophoretic material on the interior or exterior surface of the aircraft using a temporary thin film transistor (TFT) cover or blanket array that imparts an electrical charge. The electrical charge is accomplished by placing the blanket array over or in proximity to the electrophoretic capsules. The array is energized to change the capsule state and is removed. The state of the capsules will remain once the array is de-energized and the blanket array is removed. As an illustrative example, to change the airplane wing color, a blanket or array is placed onto the surface and connected to power to switch from, black to white, for example. In examples, a power source can be separate and clipped in when a change is desired, rather than integrated into the wing or other surface. Examples of the present disclosure can reduce weight and structural complexity, as in examples, the power source does not have to be carried by the vehicle.

In examples of controlling an electrophoretic coating on the exterior surface of an aircraft, a temporary electric field must be created. In some examples, the integration a traditional thin film transistor layer below the coated surface of an aircraft wing or fuselage surface can bring risks and problems. The array could have an impact on the lightning protection of the aircraft, cause coating durability issues, or increase the overall weight of the aircraft. Thus, the present disclosure provides options for areas of an aircraft or vehicle where an external, removable thin film transistor layer or array can be used to impart the necessary charge to an electrophoretically controlled layer. For example, if an electrophoretic coating is only intended to be controlled on the ground, a blanket array can be temporarily placed over the electrophoretic capsules, the array is energized to change the capsule state and then removed. The state of the capsules will remain once the array is de-energized and the blanket TFT layer removed. This reduces the electromagnetic effect risk, is expected to have a negligible coating weight impact, and can have minimal impact to onboard systems. A charged surface or array of charged sub-elements that can be temporarily applied to a surface and used to change the state of an electrophoretic coating can be advantageous for changing one or more visual states of a vehicle. Additional advantages include the fact that onboard controls are not necessary on an aircraft or vehicle, there is no added weight penalty for an integrated surface/TFT array to change the state of the electrophoretic surface, as well as a reduced risk of in-flight durability or electromagnetic environment (EME) issues. In examples, the devices of the present disclosure can be used for visible, infrared (IR), or other forms of camouflage for vehicle surfaces. Other uses can include thermal management, for examples, employing a dark surface in a cold environment, or employing a light or reflective surface in a hot environment. Other uses can include weight sensitive applications where control of electrophoretic coatings are used. It may also be useful for architectural or infrastructure applications, such as business or road signs where it may not be desirable to incorporate the integrated ability to change the display state for cost, durability, or vandalism reasons.

Additional aspects of the present disclosure include apparatuses for electrophoretic control of surfaces, including on or more integrated or external arrays including thin film transistors to impart electrical charge when in proximity to a surface. Removable TFT arrays can include a form of a flexible blanket, a sheet, wand, stationary, flexible, or rigid array sized appropriately in relation to a top surface. The top surface can include a coating or carrier layer having a plurality of electrostatically controlled ink microcapsules having one or more of the following: a negative charge component, a positive charge component, one or more colors, such as black, white, or other colors. The surface layer can also include a carrier layer, where one or more elements of the top electrophoretically controlled surface are incorporated into a polymer coating, a paint, or a film adhered to the surface. The surface can be mounted onto or applied to a substrate, such as aluminum, a resin, a polymer composite, a metal, or other substrates including metal platings, and the like. In examples, an integrated programming array connected to an integrated onboard controller or external controller can be used, an external programming computer can be connected to a temporary applied then removed array, or using an external programming device via a mobile computing device, such as a phone, tablet, or laptop. Examples can be on an interior surface of a vehicle component, or an exterior surface of a vehicle component. Changing of an appearance of a surface to provide a different state or view of advertising, branding, color, logos, camouflage, or other details can be employed. In examples of the present disclosure, security is provided by removal of the programming array, such that changes cannot be made to a visual appearance if the programming array is removed. This can allow use in rentals, provide re-branding, advertisements, flight information, or other variable state information. In examples, additional pigments can be present in background or within the electrophoretically controlled capsules. For example, up to four colors, four charging states, or four states of color may be present based on the amount of charge applied.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An apparatus for electrophoretic control of surfaces, comprising:
- a vehicle component or panel having an outer surface, comprising:
  - a substrate; and
  - a coating layer positioned on the substrate, the coating layer comprising a plurality of electrostatically controlled ink microcapsules, comprising:
    - a first pigment having a first color and a negative charge;
    - a second pigment having a second color and a positive charge; and
- a layer array comprising a plurality of thin film transistors (TFTs) disposed laterally across the layer array; and
- wherein the layer array is an external programming array removably positionable to be in proximity to the coating layer and configured to be removed from the outer surface after changing a visual appearance of the coating layer while the plurality of electrostatically controlled ink microcapsules remain in a programmed visual state.

2. The apparatus for electrophoretic control of surfaces of claim 1, wherein the thin film transistors impart an electrical charge that is introduced to the plurality of electrostatically controlled ink microcapsules when the layer array is in proximity to the outer surface.

3. The apparatus for electrophoretic control of surfaces of claim 1, wherein the layer array is removable from the apparatus for electrophoretic control of surfaces.

4. The apparatus for electrophoretic control of surfaces of claim 3, wherein the layer array comprises a flexible blanket.

5. The apparatus for electrophoretic control of surfaces of claim 3, wherein in the layer array comprises a rigid panel conforming to the outer surface of the vehicle component or panel.

6. The apparatus for electrophoretic control of surfaces of claim 3, wherein the layer array conforms to the outer surface of the vehicle component or panel.

7. The apparatus for electrophoretic control of surfaces of claim 1, wherein the layer array comprises a handheld device conformable to the outer surface of the vehicle component or panel.

8. The apparatus for electrophoretic control of surfaces of claim 1, wherein the layer array is connected to an external programming device.

9. The apparatus for electrophoretic control of surfaces of claim 1, further comprising a polymer layer, polymer coating, paint, or film adhered to the outer surface.

10. The apparatus for electrophoretic control of surfaces of claim 1, wherein the substrate comprises a metal, resin, polymer composite, metal plating, or a combination thereof.

11. The apparatus for electrophoretic control of surfaces of claim 1, further comprising:
- a third pigment having a third color and a negative charge; and
- a fourth pigment having a fourth color and a positive charge; and wherein:
  - a magnitude of the negative charge of the third pigment is different than a magnitude of the negative charge of the first pigment; and
- a magnitude of the positive charge of the fourth pigment is different than a magnitude of the positive charge of the second pigment.

12. The apparatus for electrophoretic control of surfaces of claim 1, wherein the outer surface of the vehicle component is on an interior of a vehicle.

13. The apparatus for electrophoretic control of surfaces of claim 1, wherein the outer surface of the vehicle component is on an exterior of a vehicle.

14. An apparatus for electrophoretic control of surfaces, comprising:
- a vehicle component or panel having an outer surface, comprising:
  - a substrate;
  - a coating layer positioned on the substrate, the coating layer comprising a plurality of electrostatically controlled ink microcapsules, comprising:
    - a first pigment having a first color and a negative charge;
    - a second pigment having a second color and a positive charge;
    - a third pigment having a third color and a negative charge; and
    - a fourth pigment having a fourth color and a positive charge; and wherein:
      - a magnitude of the negative charge of the third pigment is different than a magnitude of the negative charge of the first pigment; and
      - a magnitude of the positive charge of the fourth pigment is different than a magnitude of the positive charge of the second pigment; and
  - an integrated layer array positioned between the substrate and the coating layer, the integrated layer array comprising a plurality of thin film transistors (TFTs) disposed laterally across the integrated layer array.

15. The apparatus for electrophoretic control of surfaces of claim 14, further comprising a receiver in communication with the integrated layer array.

16. The apparatus for electrophoretic control of surfaces of claim 15, further comprising an external programming device connected to the receiver.

17. A method for electrophoretic control of surfaces, comprising:

placing a layer array in proximity to an outer surface of a component or panel, wherein the layer array comprises a plurality of thin film transistors (TFTs) disposed laterally across the layer array and wherein the layer array is connected to a programming device;

imparting a first electrical charge from the layer array to the component or panel wherein the outer surface of the component or panel comprises a coating layer having a plurality of electrostatically controlled ink microcapsules; and changing a visual appearance of the outer surface of the component or panel from a first visual appearance to a second visual appearance; and wherein the layer array is an external programming array removably positionable to be in proximity to the outer surface and configured to be removed from the outer surface after changing the visual appearance from the first visual appearance to the second visual appearance.

18. The method for electrophoretic control of surfaces of claim 17, further comprising removing the layer array from the outer surface of the component or panel after changing the visual appearance of the component or panel from the first visual appearance to the second visual appearance.

19. The method for electrophoretic control of surfaces of claim 17, further comprising:

reapplying the layer array onto the component or panel;

imparting a second electrical charge from the layer array to the plurality of electrostatically controlled ink microcapsules when in proximity to the outer surface of the component or panel; and changing a visual appearance of the outer surface of the component or panel from the second visual appearance to the first visual appearance when the layer array is in proximity to the outer surface.

20. The method for electrophoretic control of surfaces of claim 17, wherein the plurality of electrostatically controlled ink microcapsules comprise:

a first pigment having a first color and a negative charge; and a second pigment having a second color and a positive charge.

* * * * *